United States Patent
Chang

(10) Patent No.: US 7,059,228 B2
(45) Date of Patent: Jun. 13, 2006

(54) HAND-CONTROLLED CIRCULAR SAW

(76) Inventor: Chin-Chin Chang, No. 41, Nan-Tsun Rd., Hou-Li Hsiang, Taichung Hsien (TW)

( * ) Notice: Subject to any disclaimer, the term of this patent is extended or adjusted under 35 U.S.C. 154(b) by 51 days.

(21) Appl. No.: 10/660,406

(22) Filed: Sep. 11, 2003

(65) Prior Publication Data

US 2005/0056128 A1    Mar. 17, 2005

(51) Int. Cl.
  *B27B 5/20*    (2006.01)
(52) U.S. Cl. .................. 83/471.2; 83/471.3; 83/472; 83/485
(58) Field of Classification Search .......... 83/471.2, 83/472, 471.3, 473, 477, 483, 477.1, 485, 83/486, 486.1, 489–490, 581, 487, 488; 74/469, 74/486; 414/744.5
See application file for complete search history.

(56) References Cited

U.S. PATENT DOCUMENTS

| | | | | | |
|---|---|---|---|---|---|
| 176,343 | A | * | 4/1876 | Pay | 83/471.3 |
| 629,516 | A | * | 7/1899 | Manning | 83/471.3 |
| 1,638,122 | A | * | 8/1927 | Jull | 83/486.1 |
| 1,674,003 | A | * | 6/1928 | Casey | 30/377 |
| 1,765,733 | A | * | 6/1930 | Olsen | 83/471.3 |
| 2,317,553 | A | * | 4/1943 | Peterson | 83/477.1 |
| 5,347,902 | A | * | 9/1994 | Brickner et al. | 83/468.3 |
| 5,357,834 | A | * | 10/1994 | Ito et al. | 83/471.3 |
| 5,425,294 | A | * | 6/1995 | Ushiwata et al. | 83/471.3 |
| 6,470,778 | B1 | * | 10/2002 | Kaye et al. | 83/100 |
| 6,532,853 | B1 | * | 3/2003 | Kakimoto et al. | 83/698.11 |
| 6,769,338 | B1 | * | 8/2004 | Svetlik et al. | 83/471.3 |
| 6,892,618 | B1 | * | 5/2005 | Chin-Chin | 83/485 |
| 2002/0152867 | A1 | * | 10/2002 | Meredith et al. | 83/471.3 |
| 2003/0088986 | A1 | * | 5/2003 | Ushiwata et al. | 30/376 |
| 2003/0150311 | A1 | * | 8/2003 | Carroll et al. | 83/471.3 |

* cited by examiner

*Primary Examiner*—Allan N. Shoap
*Assistant Examiner*—Ghassem Alie

(57) ABSTRACT

A circular saw includes a universal arm mounted to a rear end of a base member of the circular saw. A housing with a saw blade is pivotally connected to the universal arm. A drive device is longitudinally mounted to the housing for driving the saw blade and includes a casing secured on the housing. A motor is securely received in the casing and radially corresponding to the saw blade along a moving direction of the saw blade. A worm is longitudinally secured on a free end of the shaft extending from the motor. A worm gear is laterally rotatably mounted to the casing and engaged to the worm. An endless belt is mounted and surrounding a first belt wheel extending from the saw blade and the second belt wheel extending from the worm gear for driving the saw blade when the motor is operated.

1 Claim, 6 Drawing Sheets

HAND-CONTROLLED CIRCULAR SAW

BACKGROUND OF THE INVENTION

1. Field of the Invention

The present invention relates to a circular saw, and more particularly to a hand-controlled saw having a motor linearly corresponding to a saw blade of the circular saw.

2. Description of Related Art

With reference to FIG. 1, a conventional circular saw in accordance with the prior art comprises a base member (50) having two guiding rods (51) mounted on a top of the base member (50). A sliding seat (60) is slidably mounted on the two guiding rods (51) and a motor (70) is laterally mounted on the sliding seat (60). A housing (80) is pivotally connected to the motor (70) and a saw blade (90) is laterally pivotally connected to the housing (80) and partially received in the housing (80). For easily driving the saw blade (90), the motor (70) perpendicularly corresponds to the saw blade (90).

However, the motor (70) laterally corresponds to a moving direction of the saw blade (90) such that the total width of the motor (70) and the housing (80) is lengthened. Consequently, the motor (70) and the housing (80) cover a great area when the saw blade (90) is moved to cut the workpiece. As a result, the user needs to prepare a great work place to prevent the motor (70) from bumping the articles beside the circular saw when the motor (70) is moved.

The present invention has arisen to mitigate and/or obviate the disadvantages of the conventional hand-controlled circular saw.

SUMMARY OF THE INVENTION

The main objective of the present invention is to provide an improved circular saw that the saw blade and the motor linearly correspond to each other.

To achieve the objective, the circular saw in accordance with the present invention comprises a universal arm mounted to a rear end of a base member of the circular saw. A housing with a saw blade is securely connected to the universal arm. A drive device is longitudinally mounted to the housing for driving the saw blade and includes a casing secured on the housing. A motor is securely received in the casing and radially corresponding to the saw blade along a moving direction of the saw blade. A worm is longitudinally secured on a free end of the shaft extending from the motor. A worm gear is laterally rotatably mounted to the casing and engaged to the worm. An endless belt is mounted and surrounding a first belt wheel extending from the saw blade and the second belt wheel extending from the worm gear for driving the saw blade when the motor is operated.

Further benefits and advantages of the present invention will become apparent after a careful reading of the detailed description with appropriate reference to the accompanying drawings.

DETAILED DESCRIPTION OF THE INVENTION

Figure 1:
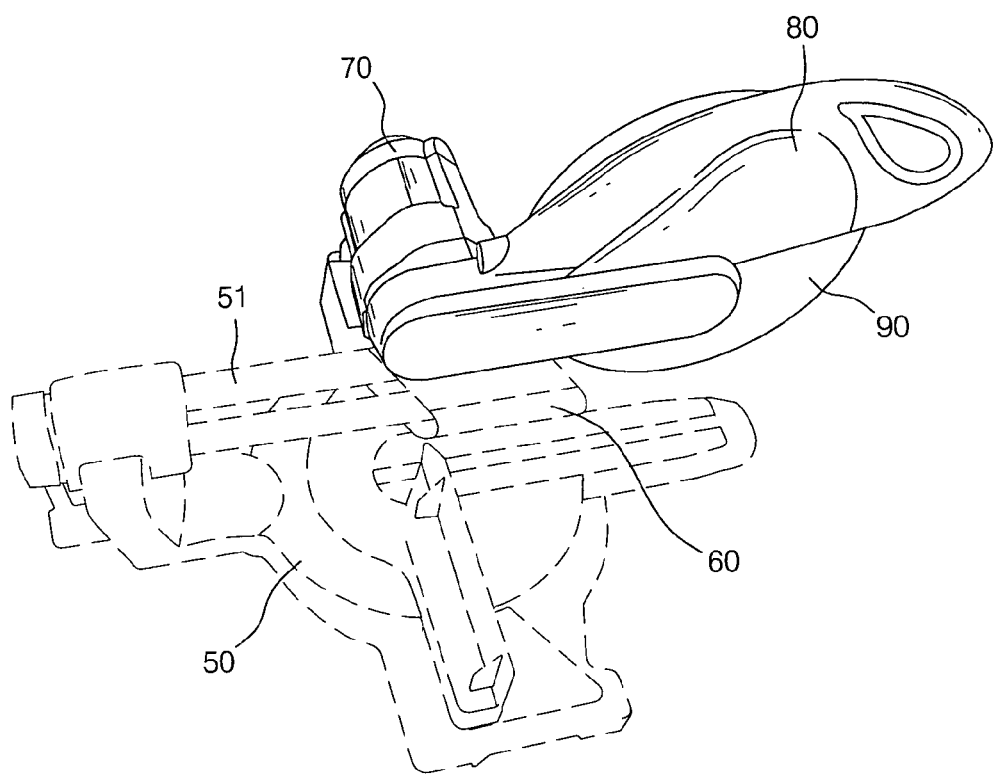
FIG. 1 is a perspective view of a conventional hand-controlled circular saw in accordance with the prior art.
Figure 2:
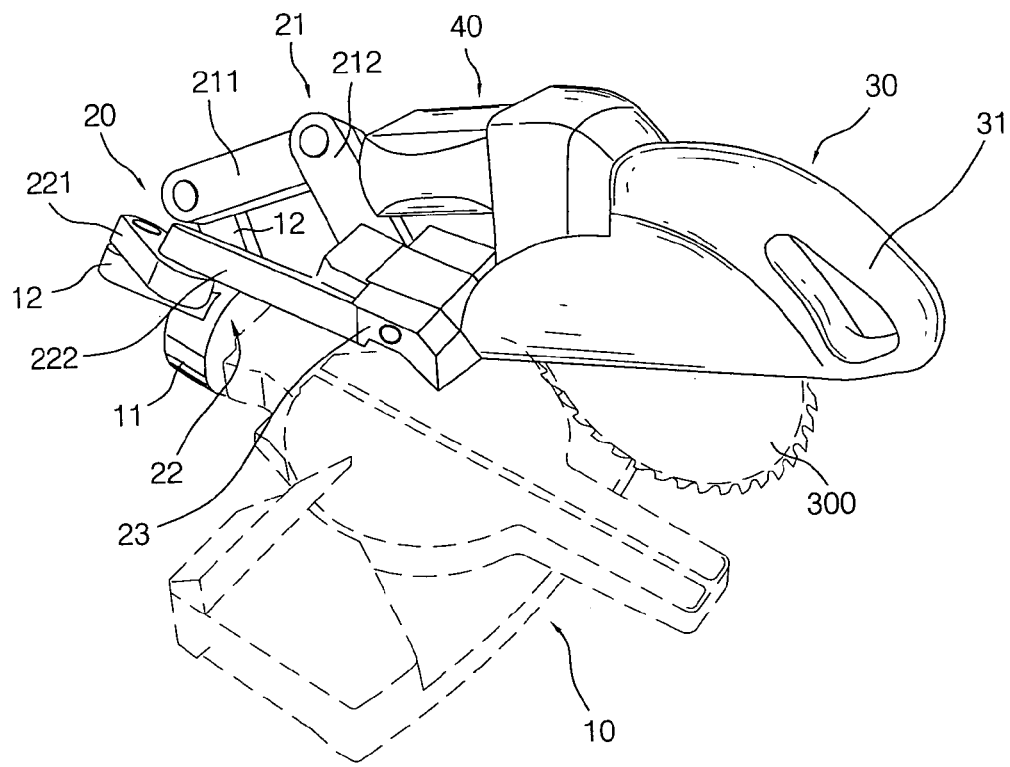
FIG. 2 is a perspective view of a hand-controlled circular saw in accordance with the present invention.
Figure 3:
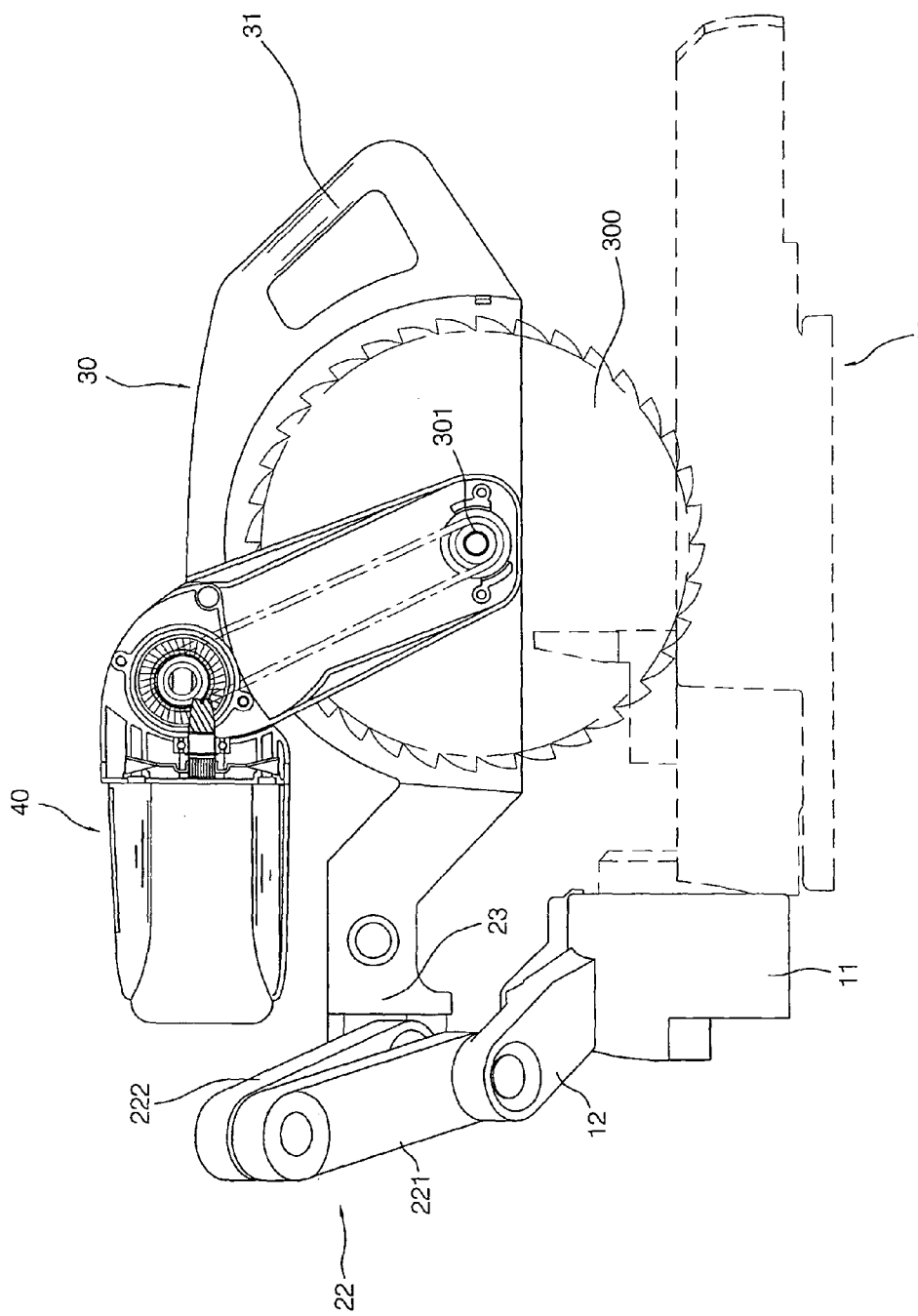
FIG. 3 is a side plan view in partial cross-section of the circular saw in FIG. 2.

With reference to the drawings and initially to FIGS. 2 and 3, a hand-controlled circular saw in accordance with the present invention comprises base member (10), a universal arm (20) pivotally mounted to the base member (10), a housing (30) with a saw blade (300) securely connected to the universal arm (20) and a drive assembly (40) longitudinally mounted to the housing (30) for driving the saw blade (300).

The base member (10) includes a supporting seat (11) pivotally mounted to a rear end of the base member (10) and two connecting rods (12) upwardly extending from the supporting seat (11). The two connecting rods (12) form a V-shape.

The universal arm (20) includes a first linkage set (21) and a second linkage set (22) respectively pivotally connected to a corresponding one of the two connecting rods (12) of the base member (10). The first linkage set (21) and the second linkage set (22) correspond to each other. The first linkage set (21) includes a first linkage (211) having a first end pivotally connected to a free end of a corresponding one of the two connecting rods (12) and a second end opposite to the first end of the first linkage (211), and a second linkage (212) having a first end pivotally connected to a second end of the first linkage (211) and a second end opposite to the first end of the second linkage (212). The structure of the second linkage set (22) is the same as that of the first linkage set (21) and has a first linkage (221) pivotally connected to a corresponding one the two connecting rods (12) and a second linkage (222) pivotally connected to the first linkage (221) of the second linkage set (22). A connector (23) is pivotally connected to the second end of each of the second linkages (212, 222).

Figure 5:
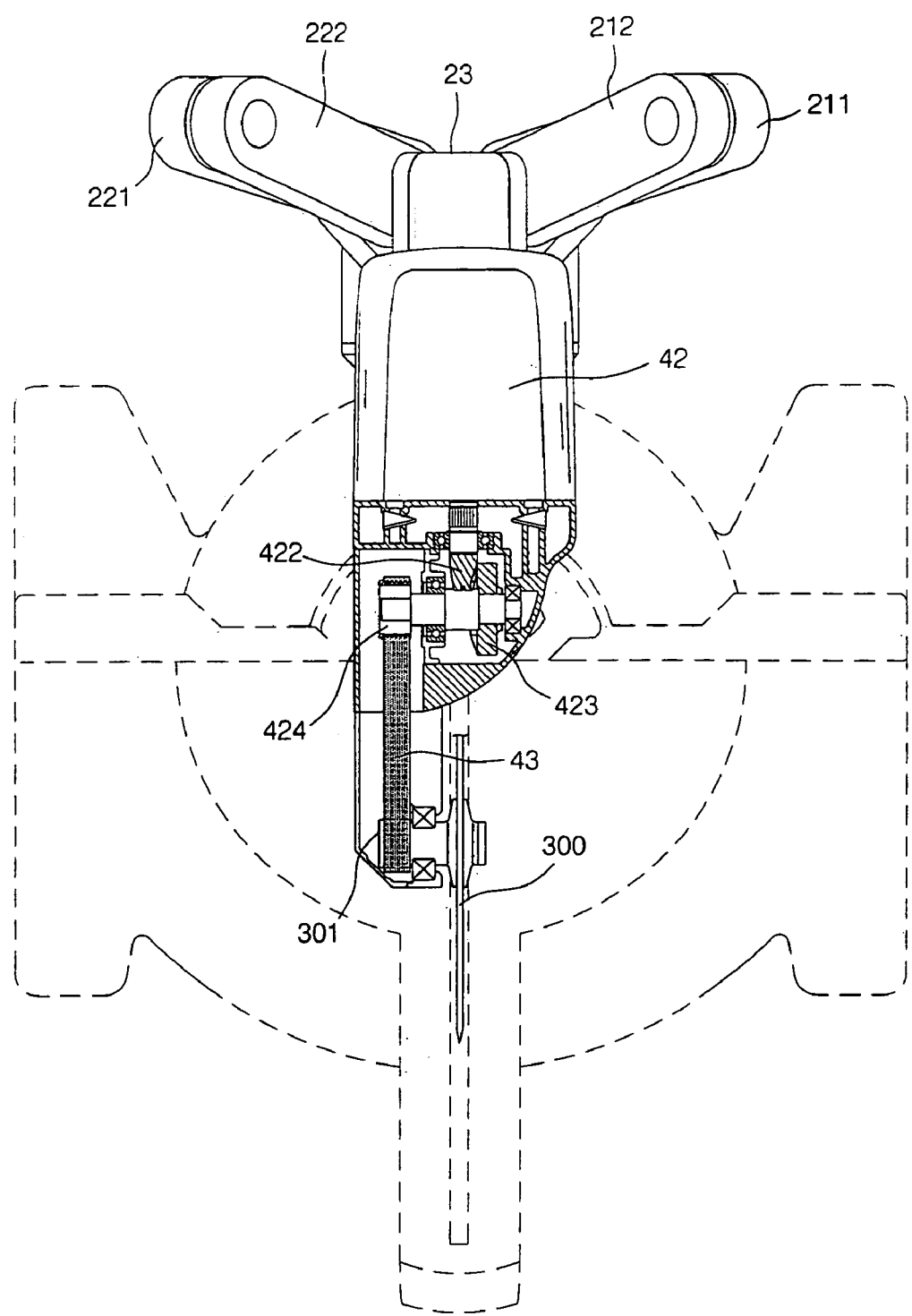
FIG. 5 is a top plan view in partial cross-section of the circular saw in FIG. 2.

The housing (30) is longitudinally and pivotally connected to the connector (23) by a pivot (not numbered) that pivotally extends through the connector and the housing (30) and the saw blade (300) is laterally and rotatably mounted to the housing (30) by a bearing, as shown in FIG. 5, and partially received in the housing (30) such that the saw blade (300) can be rotated relative to the housing (30) when the drive assembly (40) is operated to drive the saw blade (300). The housing (30) is reciprocally circularly moved relative to the connector (23). The saw blade (300) has a first belt wheel (301) laterally and centrally extending therefrom. A handle (31) is formed on the housing (30) opposite to the connector (23) for user to control the circular saw.

Figure 4:
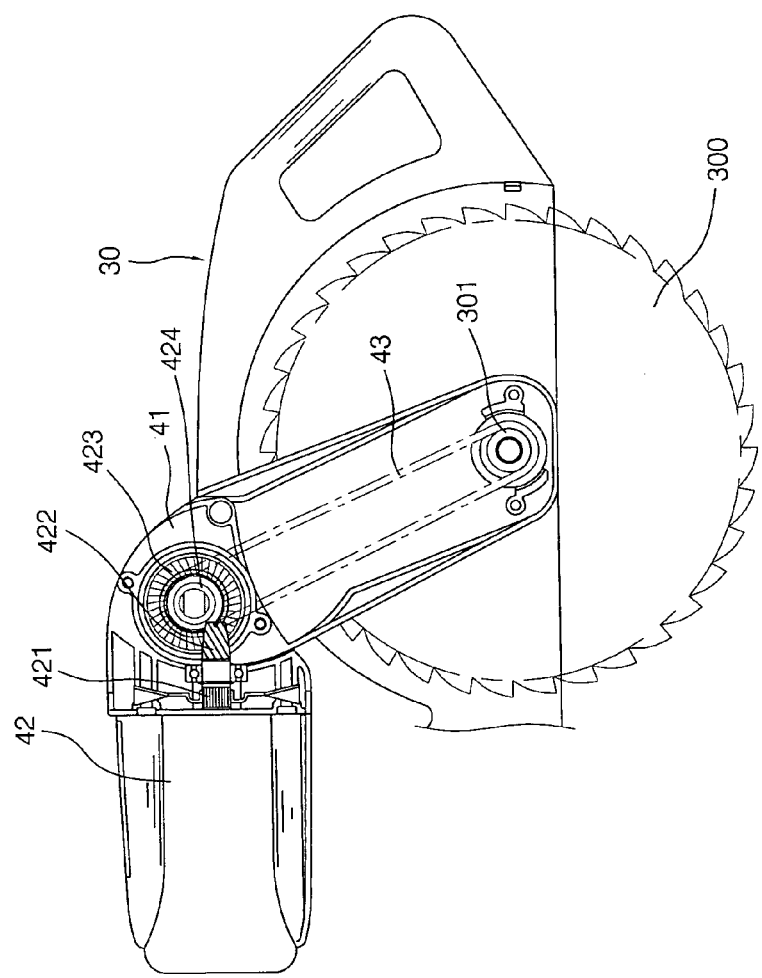
FIG. 4 is a partially enlarged side plan view in partial cross-section of the circular saw in FIG. 2.
Figure 6:
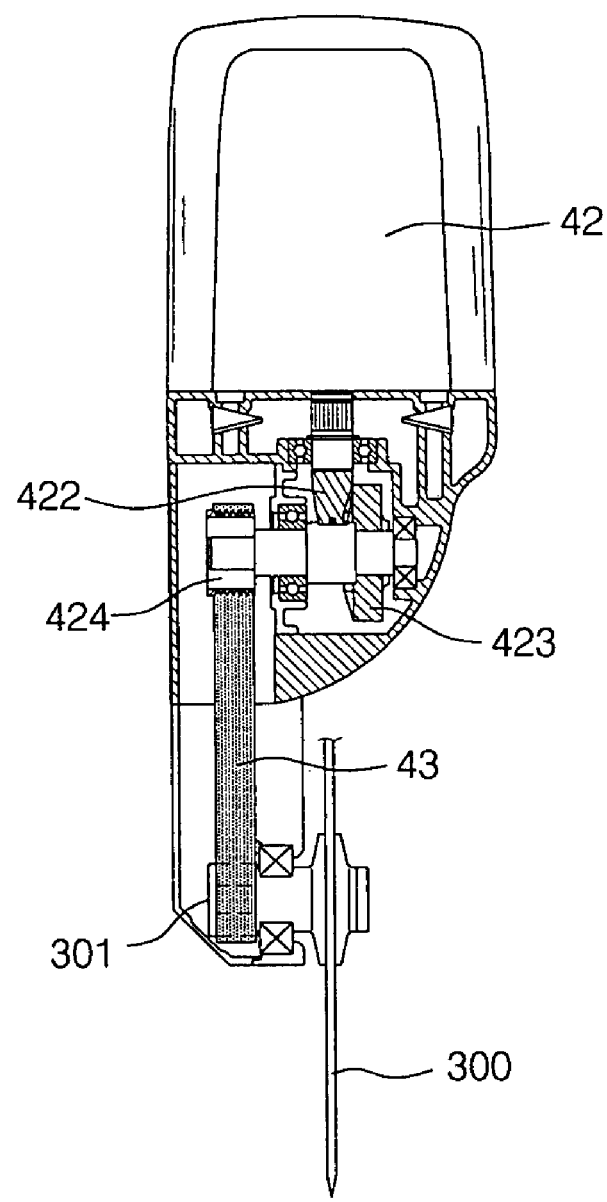
FIG. 6 is a partially enlarged top plan view in partial cross-section of the circular saw in FIG. 2.

With reference to FIGS. 4–6, the drive device (40) includes a casing (41) securely connected to the housing (30). A motor (42) is securely received in the casing (41) and radially corresponding to the saw blade (300) along a moving direction of the saw blade (300). The motor (42) includes a shaft (421) rotatably extending from the motor (42) and a worm (422) longitudinally secured on a free end of the shaft (421). A worm gear (423) is laterally and rotatably mounted to the casing (41) and engaged to the worm (422). The worm gear (423) has a second belt wheel (424) centrally and laterally extending from the worm gear (423). An endless belt (43) is mounted and surrounds the first belt wheel (301) and the second belt wheel (424). Consequently, the saw blade (300) rotated for cutting the workpiece due to the endless belt (43), the worm gear (423) and the worm (422) when the motor (42) is operated.

As described above, the hand-controlled circular saw in accordance with the present invention has the following advantages.

1. The motor (42) of the present invention longitudinally corresponds to a moving direction of the saw blade (300) such that the total width of the motor (42) and the housing (30) is reduced to prevent the motor (42) from bumping an article that is closed to circular saw.

2. The worm (422) and the worm gear (423) are further used as a gear reducer for providing a fixed and powerful output.

3. All the elements of the drive assembly (4) are received in the casing (41) such that noise of the circular saw is effectively reduced.

4. The universal arm (20) is universally moved such that the user can conveniently operate the circular saw in accordance with the present invention.

Although the invention has been explained in relation to its preferred embodiment, it is to be understood that many other possible modifications and variations can be made without departing from the spirit and scope of the invention as hereinafter claimed.

What is claimed is:

1. A hand-controlled circular saw comprising:
   a base member including a supporting seat pivotally mounted to a rear end thereof and two connecting rods upwardly extending from the supporting seat, the two connecting rods forming a V-shape;
   a universal arm pivotally mounted to a rear end of the base member, the universal arm including a first linkage set and a second linkage set respectively, which are pivotally connected to a corresponding one of the two connecting rods of the base member for the user to conveniently operate the circular saw, the first linkage set and the second linkage set corresponding to each other, the first linkage set including a first linkage having a first end pivotally connected to a free end of a corresponding one of the two connecting rods and a second end opposite to the first end of the first linkage, and a second linkage having a first end pivotally connected to the second end of the first linkage and a second end opposite to the first end of the second linkage, the second linkage set having a structure being the same as that of the first linkage set and comprises a first linkage pivotally connected to a corresponding one of the two connecting rods and a second linkage pivotally connected to the first linkage of the second linkage set, a connector pivotally connected to the second end of each of the second linkages of the first linkage set and the second linkage set, and the housing is longitudinally and pivotally connected to the connector by a pivot that pivotally extends through the connector and the housing such that the housing is reciprocally circularly moved relative the connector;
   a housing with a saw blade pivotally connected to the universal arm, the saw blade laterally and rotatably connected to the housing and partially received in the housing, the saw blade having a first belt wheel centrally and laterally extending therefrom, the housing including a handle formed thereon opposite to the motor for user to hold and operate the circular saw; and
   a drive device longitudinally mounted to the housing for driving the saw blade, the drive device including:
   a casing securely connected to the housing;
   a motor securely received in the casing and radially corresponding to the saw blade along a moving direction of the saw blade;
   a shaft rotatably extending from the motor;
   a worm longitudinally secured on a free end of the shaft;
   a worm gear laterally rotatably mounted to the casing and engaged to the worm, the worm gear having a second belt wheel laterally and centrally extending therefrom; and
   an endless belt mounted and surrounding the first belt wheel and the second belt wheel such that the saw rotates for cutting a workpiece due to the endless belt, the worm gear and the worm when the motor is operated.

* * * * *